(12) United States Patent
Aisu

(10) Patent No.: US 10,866,222 B2
(45) Date of Patent: Dec. 15, 2020

(54) CHROMATOGRAPH MASS SPECTROMETRIC DATA PROCESSING METHOD AND PROCESSING DEVICE

(71) Applicant: SHIMADZU CORPORATION, Kyoto (JP)

(72) Inventor: Ryota Aisu, Kyoto (JP)

(73) Assignee: SHIMADZU CORPORATION, Kyoto (JP)

(*) Notice: Subject to any disclaimer, the term of this patent is extended or adjusted under 35 U.S.C. 154(b) by 331 days.

(21) Appl. No.: 15/773,702

(22) PCT Filed: Nov. 5, 2015

(86) PCT No.: PCT/JP2015/081148
§ 371 (c)(1),
(2) Date: Oct. 2, 2018

(87) PCT Pub. No.: WO2017/077618
PCT Pub. Date: May 11, 2017

(65) Prior Publication Data
US 2019/0041369 A1    Feb. 7, 2019

(51) Int. Cl.
*G01N 30/86*    (2006.01)
*H01J 49/00*    (2006.01)
(Continued)

(52) U.S. Cl.
CPC ..... *G01N 30/8631* (2013.01); *G01N 30/7233* (2013.01); *G01N 30/8679* (2013.01); *H01J 49/0036* (2013.01); *H01J 49/26* (2013.01)

(58) Field of Classification Search
CPC ........... G01N 30/8679; G01N 30/7233; G01N 30/8631; H01J 49/0036; H01J 49/26
See application file for complete search history.

(56) References Cited

U.S. PATENT DOCUMENTS 4,807,148 A    2/1989  Lacey
2006/0255258 A1*  11/2006  Wang ................. G01N 30/8665
                                                          250/282

FOREIGN PATENT DOCUMENTS

EP    0 294 121 A2    12/1988
JP    63-308560 A    12/1988
JP    2012-042322 A    3/2012

OTHER PUBLICATIONS

Ouyang et al., "Application of sparse linear discriminant analysis for metabolomics data", Analytical Methods, 2014, vol. 6, No. 22, pp. 9037-9044, (total 8 pages).
(Continued)

*Primary Examiner* — Yoshihisa Ishizuka
(74) *Attorney, Agent, or Firm* — Sughrue Mion, PLLC

(57) ABSTRACT

A compound-weight time-series data calculator creates a compound spectrum matrix based on standard mass spectra of various compounds stored in a standard mass spectrum library. Then, the calculator determines, in the form of a linear regression model, the relationship of the matrix, a measured vector based on the data acquired at one measurement time point, and a compound weight vector at the measurement time point, and estimates the unknown weight vector by a minimum norm estimation in which a regularizer is introduced. A compound-weight time-series graph creator creates a compound-weight time-series graph showing a temporal change in weight for each target compound, based on the compound weight vector obtained at the measurement time points within a specified time range. A peak which appears on this graph is used for the quantitative determination of the compound or determination on the presence or absence of the compound.

10 Claims, 4 Drawing Sheets

(51) Int. Cl.
*H01J 49/26* (2006.01)
*G01N 30/72* (2006.01)

(56) References Cited

OTHER PUBLICATIONS

El Anbari et al., "Penalized regression combining the $L_1$ norm and a correlation based penalty", Sankhyā: The Indian Journal of Statistics, 2014, vol. 76-B, No. 1, pp. 82-102 (total 21 pages).
Communication dated Sep. 23, 2019 from European Patent Office in counterpart EP Application No. 15907804.7.
"Lasso Oyobi Elastic Net (Lasso and Elastic Net)", [online], The MathWorks, Inc., USA, [accessed on Oct. 16, 2015], 4 pages.
Christopher M. Bishop, "Pattern Recognition and Machine Learning", Springer-Verlag, 2006, 703 pages, USA.
International Search Report for PCT/JP2015/081148 dated, Jan. 19, 2016 (PCT/ISA/210).
Written Opinion for PCT/JP2015/081148 dated, Jan. 19, 2016 (PCT/ISA/237).

\* cited by examiner

WHEN α SHOULD BE SET TO SMALL VALUE

WHEN α SHOULD BE SET TO LARGE VALUE

CHROMATOGRAPH MASS SPECTROMETRIC DATA PROCESSING METHOD AND PROCESSING DEVICE

CROSS REFERENCE TO RELATED APPLICATIONS

This application is a National Stage of International Application No. PCT/JP2015/081148, filed Nov. 5, 2015.

TECHNICAL FIELD

The present invention relates to a data processing method and processing device for processing data collected with a chromatograph mass spectrometer, such as a liquid chromatograph mass spectrometer (LC-MS) or gas chromatograph mass spectrometer (GC-MS) in which a liquid chromatograph (LC) or gas chromatograph (GC) is combined with a mass spectrometer, in order to determine the presence or absence of a target compound in a sample or determine the quantity of the target compound.

BACKGROUND ART

In an LC-MS, mass spectrum data which show the relationship between the mass-to-charge ratios of ions originating from the components in an eluate supplied from the column of the LC and the signal intensities of those ions can be continuously acquired with the passage of time by repeating a scan measurement for the eluate over a predetermined range of mass-to-charge ratios m/z in the mass spectrometer. An extracted ion chromatogram (XIC), which shows a temporal change in signal intensity of an ion having a specific mass-to-charge ratio, can be created by extracting data showing the signal intensity at the specific mass-to-charge ratio from the acquired data and arranging the extracted data in a time-series order. A mixed ion chromatogram (MIC) can be created by extracting data showing the signal intensities at a plurality of specific mass-to-charge ratios, adding the signal intensities at each measurement point (retention time), and arranging the obtained values in a time-series order. Furthermore, a total ion chromatogram (TIC) can be created by adding the data of the signal intensities at all mass-to-charge ratios which appear on one mass spectrum and arranging the obtained values in a time-series order.

For example, in the case of determining the quantity of a target compound contained in a sample, an XIC at the mass-to-charge ratio of an ion originating from the target compound or an MIC including that mass-to-charge ratio is created. A peak corresponding to the target compound on that chromatogram is detected, and the area value of the peak is calculated. With reference to a previously determined calibration curve which shows the relationship between the concentration (content) of the target compound and the peak area value, the concentration value is calculated from the peak area value based on the measured chromatogram. In the case of determining the presence or absence of a target compound in a sample, an XIC at the mass-to-charge ratio of an ion originating from the target compound is created, and the detection of a peak corresponding to the target compound on the XIC is attempted. If the peak is detected, it is possible to conclude that the target compound is present. If the peak is not detected, it is possible to conclude that the target compound is not present.

If the compound to be quantitatively determined or detected is previously specified, not only the mass-to-charge ratio but also the retention time of the ion originating from the target compound is previously known. Accordingly, in normal cases, a peak on the XIC or MIC is detected within a predetermined time range around the retention time of the target compound. The beginning and ending points of the detected peak are determined, and the peak area value is calculated (for example, see Patent Literature 1).

However, an error in mass-to-charge ratio (mass discrepancy) of the ion detected in the mass spectrometer may occur due to various factors. In such a case, the peak originating from the target compound may not appear on the XIC or MIC on which the peak originating from the target compound should be observed, and it may become impossible to detect the peak or calculate its peak area value. As another situation, if a plurality of compounds are not sufficiently separated from each other in the LC, a peak originating from a different compound may overlap the peak originating from the target compound on the XIC or MIC. In such a case, the apparent position of the peak top originating from the target compound may be shifted beyond the time range around the retention time, and it may become impossible to detect the peak. Furthermore, if the content of the target compound is low, the noise in the XIC created at the mass-to-charge ratio of the ion originating from the target compound becomes relatively high, in which case the peak originating from the target compound may be difficult to detect due to the noise, or a considerable error may occur in the peak area value.

CITATION LIST

Patent Literature

Patent Literature 1: JP 2012-42322 A (Paragraph [0002])
Patent Literature 2: JP 63-308560 A Non Patent Literature Non Patent Literature 1: "Lasso Oyobi Elastic Net (Lasso and Elastic Net)", [online], The MathWorks, Inc., USA, [accessed on Oct. 16, 2015], the Internet
Non Patent Literature 2: C. M. Bishop, *Pattern Recognition and Machine Learning*, Springer-Verlag, USA, 2006

SUMMARY OF INVENTION

Technical Problem

The present invention has been developed to solve the previously described problem. Its objective is to provide a chromatograph mass spectrometric data processing method and processing device with which a peak originating from a target compound on an XIC or MIC can be obtained with a lower level of noise than on a conventional XIC or MIC, and furthermore, a quantitative determination based on the area value of a peak observed on an XIC or MIC can be performed with a higher level of accuracy than on a conventional XIC or MIC even when an overlapping of noise, mass discrepancy, temporal shift of the peak top or other unfavorable factors are present.

Solution to Problem

The first aspect of the present invention developed for solving the previously described problem is a chromatograph mass spectrometric data processing method for processing mass spectrum data repeatedly acquired with the passage of time by chromatograph mass spectrometry, including:

a) a compound weight vector calculation step including: performing a maximum likelihood estimation for each of the mass spectrum data respectively acquired at measurement time points within a predetermined time range which includes at least the retention time of a target compound, to determine a compound weight vector wt at each measurement time point, where the maximum likelihood estimation includes: determining, in the form of a linear regression model, the relationship of a measured vector Mt, the compound weight vector wt, and a compound spectrum matrix L, where the measured vector Mt is based on mass spectrum data acquired at a measurement time point t, has a dimension number equal to the number of mass-to-charge-ratio points and includes signal intensity values as elements, the compound weight vector wt has a dimension number equal to the number of target compounds at the measurement time point t and includes the weights of the respective target compounds as elements, and the compound spectrum matrix L is based on standard mass spectra of the target compounds, has a row number equal to the number of mass-to-charge-ratio points and a column number equal to the number of target compounds, and includes signal intensity values as elements; and estimating the compound weight vector wt by a minimum norm estimation in which a regularizer is introduced, based on the known measured vector Mt and the known compound spectrum matrix L; and b) a peak detection step including: creating a graph in which the weights of a target compound are arranged in a time-series order to show a temporal change in weight, based on a plurality of the compound weight vectors wt acquired for a predetermined time range in the compound weight vector calculation step, and detecting a peak corresponding to the target compound in the graph, and performing a qualitative determination or quantitative determination for the target compound using the peak detected in the peak detection step.

The second aspect of the present invention developed for solving the previously described problem is a processing device for carrying out the chromatograph mass spectrometric data processing method according to the first aspect of the present invention, which is a chromatograph mass spectrometric data processing device for processing mass spectrum data repeatedly acquired with the passage of time by chromatograph mass spectrometry, including:

a) a compound weight vector calculator for performing a maximum likelihood estimation for each of the mass spectrum data respectively acquired at measurement time points within a predetermined time range which includes at least the retention time of a target compound, to determine a compound weight vector wt at each measurement time point, where the maximum likelihood estimation includes: determining, in the form of a linear regression model, the relationship of a measured vector Mt, the compound weight vector wt, and a compound spectrum matrix L, where the measured vector Mt is based on mass spectrum data acquired at a measurement time point t, has a dimension number equal to the number of mass-to-charge-ratio points and includes signal intensity values as elements, the compound weight vector wt has a dimension number equal to the number of target compounds at the measurement time point t and includes the weights of the respective target compounds as elements, and the compound spectrum matrix L is based on standard mass spectra of the target compounds, has a row number equal to the number of mass-to-charge-ratio points and a column number equal to the number of target compounds, and includes signal intensity values as elements; and estimating the compound weight vector wt by a minimum norm estimation in which a regularizer is introduced, based on the known measured vector Mt and the known compound spectrum matrix L;

b) a peak detector for creating a graph in which the weights of a target compound are arranged in a time-series order to show a temporal change in weight, based on a plurality of the compound weight vectors wt acquired for a predetermined time range by the compound weight vector calculator, and detecting a peak corresponding to the target compound in the graph; and c) a processor for performing a qualitative determination for the target compound based on a peak detection result by the peak detector or a quantitative determination for the target compound based on the area or height of the peak detected by the peak detector.

In the first and second aspects of the present invention, the chromatograph mass spectrometry is typically an LC/MS analysis or GC/MS analysis. A bell-shaped change in concentration of one component (compound) introduced into a mass spectrometer also similarly occurs in the case of a flow injection analysis (FIA) method in which a sample is introduced into the mass spectrometer by a flow of the mobile phase without being separated into components by a column. Accordingly, the "chromatograph mass spectrometry" mentioned earlier should be construed as inclusive of a mass spectrometry which employs the FIA method for sample introduction.

In the compound weight vector calculation step in the chromatograph mass spectrometric data processing method according to the first aspect of the present invention, a linear regression model is determined, which is typically expressed by the following equation (1). It should be noted that the "weight" of a compound in the present context represents the degree of contribution of that compound in a sample. Accordingly, the weight effectively reflects the concentration or relative content of the compound concerned.

$$Mt = Lwt + \varepsilon \qquad (1)$$

In this equation, $\varepsilon$ is a probability vector representing the noise. Mt is the data obtained by a measurement. L can be determined by experiments, from an existing database or the like. Since Mt and L are previously known, equation (1) can be considered as a problem of the linear regression analysis for determining the maximum likelihood estimation value of the unknown wt under the given Mt and L. A conventionally known technique for solving such a problem employs the least squares method (see Patent Literature 2). However, in such a conventional technique, overfitting may occur and cause an increase in the error against expectations. To avoid this situation, in the compound weight vector calculation step, the minimum norm estimation in which a regularizer is introduced is used to estimate the compound weight vector wt.

In the compound weight vector calculation step, a compound weight vector wt is determined based on a measured vector Mt and a compound spectrum matrix L at each measurement time point within a time range which, for example, is set by a user or has a predetermined time width around the known retention time for a target compound specified by a user, where the measured vector Mt is obtained at each measurement time point based on mass spectrum data acquired by actual measurements, whereas the compound spectrum matrix L is common to all measurement time points. In the peak detection step, a weight time-series graph in which the weights of a target compound are arranged in a time-series order is created from a plurality of compound weight vectors wt obtained in the previously described manner. The weight time-series graph shows a temporal change in weight of the target compound. Accordingly, as in the XIC, a peak corresponding to the target compound appears on this graph, and this peak has a similar shape to the peak on the XIC.

Therefore, if a peak which originates from the target compound (or is estimated to have originated from the target compound) is detected on the weight time-series graph, it is possible to determine that the target compound is contained in the measured sample. Additionally, a calibration curve showing the relationship between the peak area value on the weight time-series graph and the concentration value can be previously determined. By referring to this calibration curve, the concentration value can be determined from the peak area value on the weight time-series graph.

In the chromatograph mass spectrometric data processing method according to the first aspect of the present invention and the chromatograph mass spectrometric data processing device according to the second aspect of the present invention, the regularizer used in the minimum norm estimation may be either an L1 norm or an L2 norm.

In general, the L1 norm is highly selective. Therefore, when the L1 norm is used as the regularizer, a robust peak can be obtained for one target compound. However, in a situation in which a plurality of peaks originating from different compounds overlap each other on the XIC, i.e. in a situation in which there is a high correlation between variables, a proper peak cannot be obtained on the weight time-series graph. By comparison, when the L2 norm is used as the regularizer, a peak which is satisfactory to a certain degree can be obtained on each of the weight time-series graphs respectively created for those compounds even in a situation in which a plurality of peaks originating from those compounds overlap each other on the XIC.

Accordingly, in the chromatograph mass spectrometric data processing method according to the first aspect of the present invention and the chromatograph mass spectrometric data processing device according to the second aspect of the present invention, it is preferable to use the L1 norm and the L2 norm in a switchable manner as the regularizer or simultaneously use both the L1 norm and the L2 norm as the regularizer.

In the case where the L1 norm and the L2 norm are used in a switchable manner as the regularizer, it is preferable to allow a user to select the use of either the L1 norm or the L2 norm according to specific conditions, such as the state of the sample (e.g. whether the quantity of the target compound subjected to the measurement is large or small, or whether or not there is a large amount of foreign substance other than the compounds which are measurement targets). It is also possible to automatically determine the state of overlapping of the compounds from the XIC, MIC and/or TIC created from the collected mass spectrum data, and switch the use of either the L1 norm or the L2 norm according to the determination result.

More preferably, the elastic net may be introduced to use the L1 norm and the L2 norm in a switchable manner or simultaneously use both the L1 norm and the L2 norm. As described in Non-Patent Literature 1 or other documents, in the elastic net, the degrees of contribution of the L1 norm and the L2 norm are adjusted according to the value of the parameter α ($0 \leq \alpha \leq 1$). By determining this parameter α through a manual operation by the user or an automatic determination process mentioned earlier, it is possible to obtain a satisfactory peak, i.e. a peak with a high signal-to-noise ratio, for one target compound or for each of a plurality of target compounds, depending on the state of overlapping of the compounds or other factors at the time.

Advantageous Effects of Invention

With the chromatograph mass spectrometric data processing method and processing device according to the present invention, it is possible to obtain a robust peak which contains a smaller amount of noise than a peak observed on an XIC or MIC created from mass spectrum data. Accordingly, for example, a higher level of accuracy can be achieved in the case of determining whether or not a target compound is contained in a sample based on the presence or absence of a peak originating from the target compound. Furthermore, in the case of determining the quantity of a target compound based on the area value of a detected peak, the accuracy of the peak area value will be improved, so that a higher level of quantitative accuracy can be achieved.

In the chromatograph mass spectrometric data processing method and processing device according to the present invention, not only the signal intensity at a specific mass-to-charge ratio but also the signal intensities at neighboring mass-to-charge ratios are reflected in the weight time-series graph. Therefore, a peak originating from the target compound can satisfactorily be obtained even if a shift occurs in the mass-to-charge ratio of the ion originating from the target compound. Furthermore, even in the case where there is a temporal shift in the peak top of a peak originating from the target compound on the XIC, a peak originating from the target compound can be assuredly obtained on the weight time-series graph by appropriately setting the time range for which the graph is created.

DESCRIPTION OF EMBODIMENTS

One embodiment of an LC-MS including a chromatograph mass spectrometric data processing device according to the present invention is hereinafter described with reference to the attached drawings.

Figure 1:
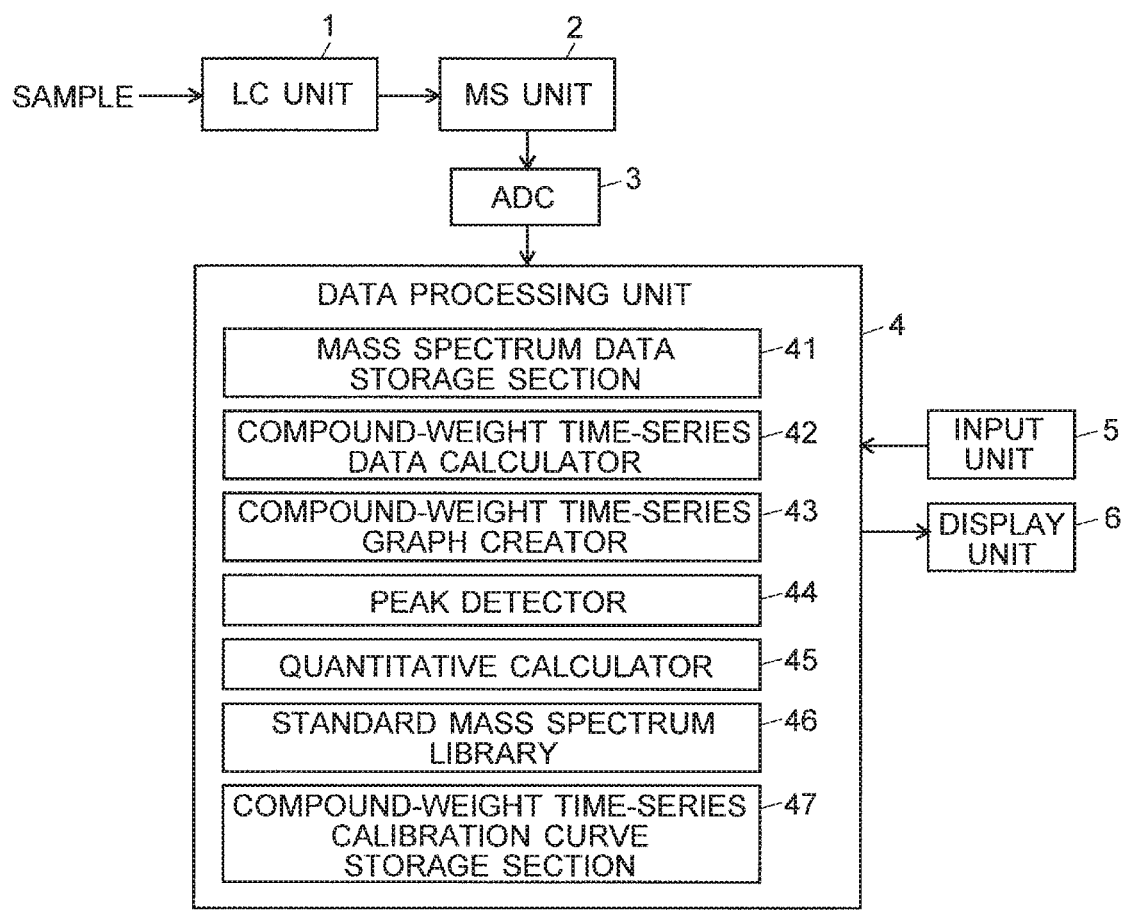
FIG. 1 is a schematic configuration diagram of one embodiment of an LC-MS including a data processing device according to the present invention.

FIG. 1 is a configuration diagram of the LC-MS according to the present embodiment. The LC-MS in the present embodiment includes a liquid chromatograph (LC) unit 1, mass spectrometer (MS) unit 2, analogue-to-digital converter (ADC) 3, data processing unit 4, input unit 5 and display unit 6. Though not shown, the LC unit 1 includes a liquid supply pump for supplying a mobile phase at a fixed flow rate, an injector for injecting a sample into the mobile phase being supplied, a column for temporally separating the compounds contained in the sample, and other components. The MS unit 2 is, for example, a quadrupole or time-of-flight type of mass spectrometer including an electrospray ion source.

The data processing unit 4 includes a mass spectrum data storage section 41, compound-weight time-series data calculator 42, compound-weight time-series graph creator 43, peak detector 44, quantitative calculator 45, standard mass spectrum library 46, and compound-weight time-series calibration curve storage section 47 as its functional blocks to perform the characteristic data processing (which will be described later). The standard mass spectrum library 46 is a database which contains standard mass spectra for various compounds. Those data can be obtained by actual measurements on standard samples or retrieved from compound databases open to the public. In normal cases, the functions of the data processing unit 4 can be embodied by running, on a personal computer, a dedicated data-processing software program installed on the same computer.

A data-collecting operation for a sample in the LC-MS according to the present invention is hereinafter schematically described.

In the LC unit 1, while a mobile phase is being supplied to the column at a substantially fixed flow rate, a sample is injected from the injector into the mobile phase at a predetermined timing. Being carried by the flow of the mobile phase, the sample is introduced into the column. While passing through the column, the various compounds contained in the sample are temporally separated from each other. As a result, different compounds successively appear with the passage of time in the sample introduced from the LC unit into the MS unit 2. In the MS unit 2, a scan measurement over a predetermined range of mass-to-charge ratios is repeatedly performed at each of the measurement time points arranged at predetermined intervals of time. A set of data which constitute one mass spectrum is obtained by one scan measurement. The data are sent through the ADC 3 into the data processing unit 4 and stored in the mass spectrum data storage section 41. Thus, mass spectrum data obtained at each measurement time point are stored in the mass spectrum data storage section 41 during the period from the point of injection of the sample into the mobile phase to the point of completion of the measurement.

Next, a characteristic data-processing operation is described which is performed in the case of determining the quantity of a target compound contained in a sample based on the data stored in the mass spectrum data storage section 41 in the previously described manner.

Figure 2:
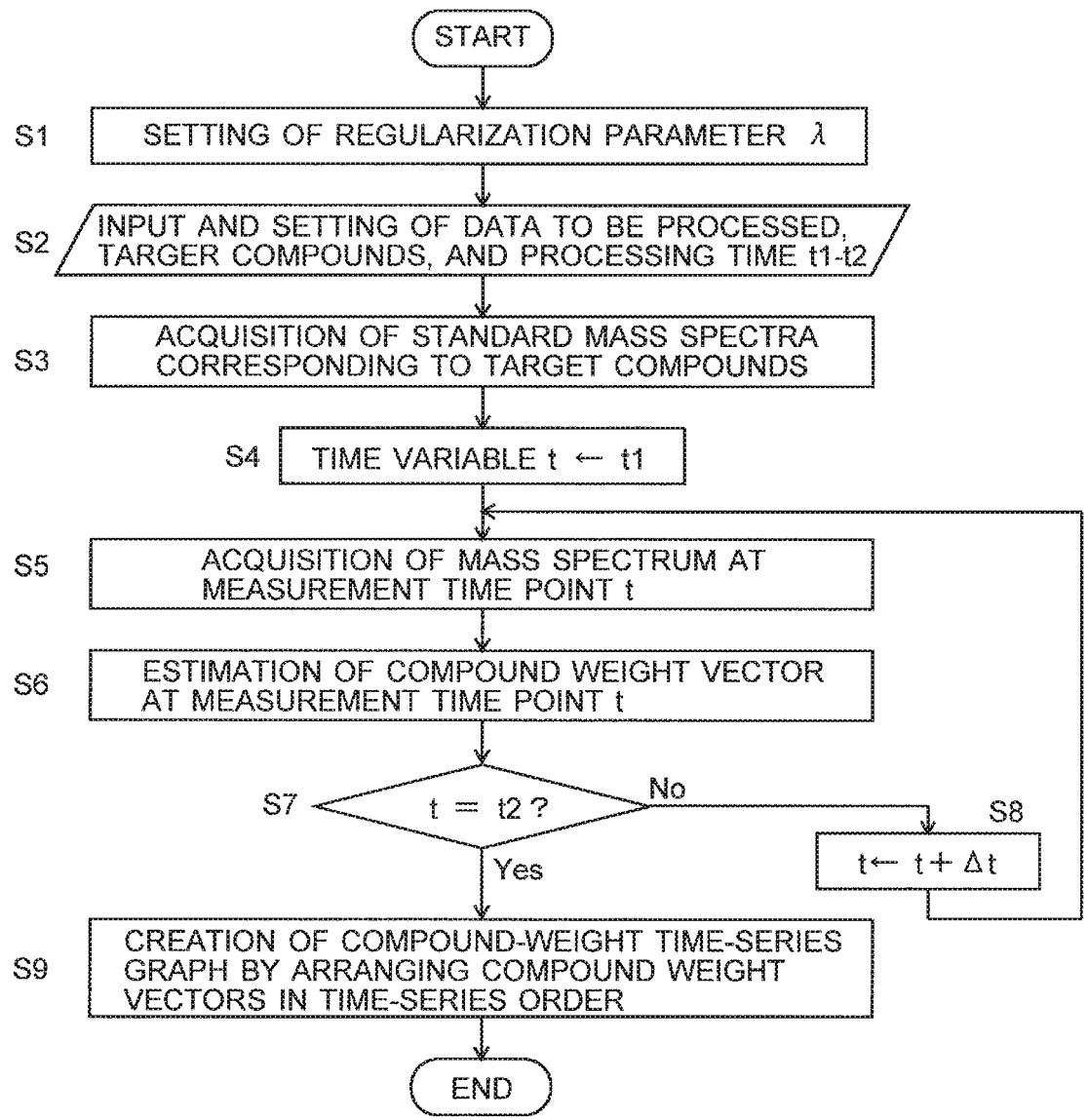
FIG. 2 is a flowchart showing the steps of the process of acquiring compound-weight time-series data in the LC-MS according to the present embodiment.
Figure 3:
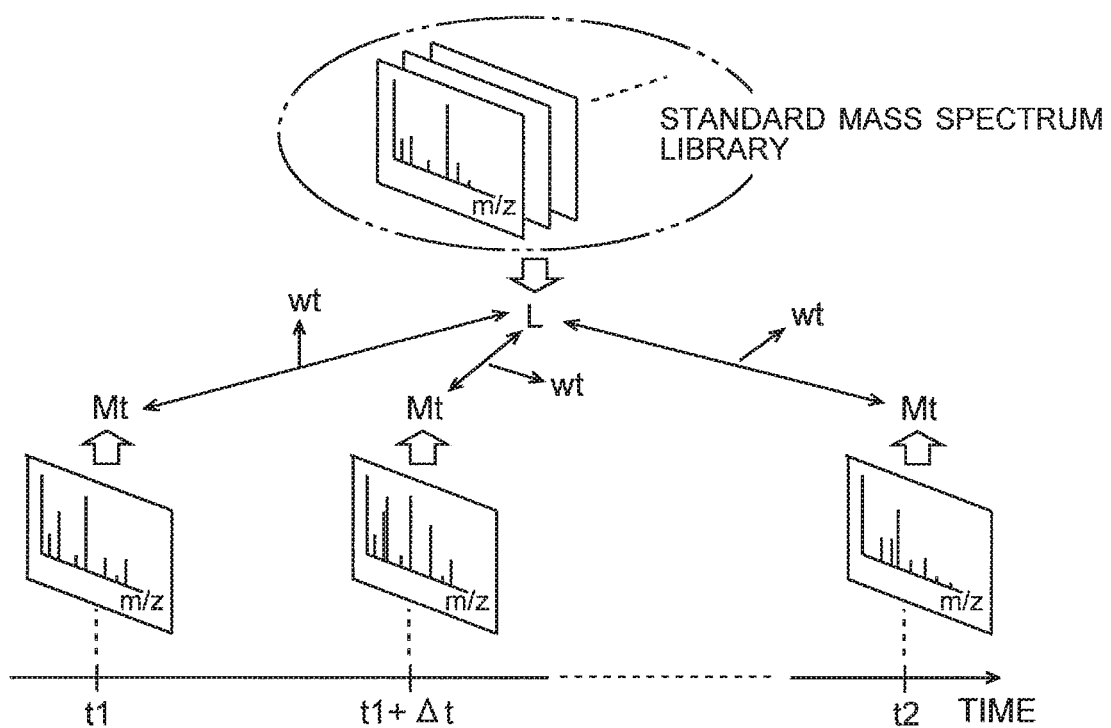
FIG. 3 is a conceptual diagram for explaining the process of acquiring compound-weight time-series data.

FIG. 2 is a flowchart showing the steps of the process of creating a compound-weight time-series graph. FIG. 3 is a conceptual diagram for explaining the process of creating a compound-weight time-series graph.

Consider the case of determining the quantity of a target compound for which the retention time and the mass-to-charge ratio of the target ion are previously known. According to a common procedure, an XIC at the mass-to-charge ratio of the target ion (or another characteristic ion) is created, and a peak originating from the target compound is detected on the XIC. By comparison, in the LC-MS according to the present embodiment, a process of creating a compound-weight time-series graph is carried out as will be described later, and a peak originating from the target compound is detected on this graph. The compound-weight time-series graph is hereinafter initially described.

Let $Mt$ denote a measured vector representing mass spectrum data acquired by a measurement at a measurement time $t$, let $L$ denote a compound spectrum matrix representing standard mass spectra for a plurality of compounds, and let $wt$ denote a compound weight vector at the measurement time $t$. The measured vector $Mt$ is a P-dimensional vector which has a dimension number equal to the number of mass-to-charge-ratio points P in the mass spectrum and includes, as its elements, signal intensity values respectively obtained at the P mass-to-charge-ratio values. The compound spectrum matrix $L$ is a matrix which has a row number equal to the number of compounds N and a column number equal to the number of mass-to-charge-ratio points P in the mass spectrum, and includes, as its elements, the signal intensity values respectively obtained at the P mass-to-charge-ratio values of each compound. The compound weight vector $wt$ is an N-dimensional vector which has a dimension number equal to the number of compounds N and includes, as its elements, the values of the weights at the N compounds. The relationship of $Mt$, $wt$ and $L$ can be expressed by a linear regression model, as described in equation (1) mentioned earlier. This equation (1) is once more presented below:

$$Mt = Lwt + \varepsilon \quad (1)$$

where $\varepsilon$ is a probability vector representing the noise.

The measured vector $Mt$ is obtained from the data stored in the mass spectrum data storage section 41. The compound spectrum matrix $L$ can be created from the data previously stored in the standard mass spectrum library 46. On the assumption that $\varepsilon$ is a Gaussian white noise, there is only one unknown variable in equation (1), i.e. $wt$. Accordingly, equation (1) can be considered as the problem of a linear regression analysis in which the maximum likelihood estimation value of the compound weight vector $wt$ should be determined (see Non-Patent Literature 2 or other documents). A commonly known standard solution to such an inverse problem is the minimum norm estimation. However, overfitting easily occurs if the minimum norm estimation employing the least squares method is used. To avoid this problem, the minimum norm estimation method in which a regularizer is introduced is used. An L1 norm and an L2 norm are known as the regularizer, of which the L2 norm is more commonly used. If the L2 norm is introduced as the regularizer, a value of $wt$ which minimizes the evaluation function expressed by the following equation (2) will be the optimum solution:

$$J(w) = (1/2)\|Mt - Lwt\|^2 + (\lambda/2)\|wt^T wt\| \quad (2)$$

The value of $wt$ which minimizes the evaluation function can be determined by evaluating the differential of $J(w)$ with respect to $w$ and locating a point at which the differential value becomes zero. The differential of the evaluation function is given by the following equation (3):

$$dJ(w)/dw = -L^T(Mt - Lwt) + \lambda wt \quad (3)$$

where $\lambda$ is an appropriately determined regularization parameter. A value of $wt$ which makes the left side of equation (3) zero is the value that minimizes the left side of equation (2), and is the parameter for the maximum likelihood estimation. Given that the differential is zero, equation (3) can be rewritten as follows:

$$(L^T L + \lambda I) wt = L^T Mt \quad (4)$$

Accordingly, the estimated value of the compound weight vector $wt$ is given by:

$$wt = (L^T L + \lambda I)^{-1} L^T Mt \quad (5)$$

Equation (5) gives the compound weight vector $wt$ at one specific measurement time point $t$. Therefore, a compound-weight time-series matrix W can be obtained by determining the compound weight vector $wt$ at each of the measurement time points within the entire measurement time range from the beginning point to the end point of the measurement, or within a predetermined time range, and arranging those vectors in a time-series order. This is a matrix which has a row number equal to the number of compounds and a column number equal to the number of measurement time points. By extracting the weight of a specific compound from this matrix, a compound-weight time-series graph can be obtained. Since this weight reflects the concentration of the compound, the compound-weight time-series graph shows a temporal change in concentration of a specific compound. Therefore, a peak which appears in the compound-weight time-series graph can be used for the qualitative determination (whether or not a compound is present) or quantitative determination of a compound in a similar manner to a peak on the XIC or MIC. In the present technique, the compound spectrum matrix may consist of elements which are related to a single target compound. Alternatively, the compound spectrum matrix may be created from standard mass spectra corresponding to a number of target compounds, in which case the compound-weight time-series matrices and the compound-weight time-series graphs at those target compounds can be simultaneously obtained.

Subsequently, a specific processing procedure is described with reference to FIGS. 2 and 3.

In advance of the processing, the compound-weight time-series data calculator 42 sets the predetermined regularization parameter $\lambda$ (Step S1). In general, the regularization parameter $\lambda$ can be experimentally determined by the manufacturer of the present device. Subsequently, a user operating the input unit 5 specifies the data to be processed, one or more target compounds, and a time range t1-t2 for the processing (Step S2). The compound-weight time-series data calculator 42 reads the standard mass spectra corresponding to the specified target compounds from the standard mass spectrum library 46 and creates the compound spectrum matrix L (Step S3). As shown in FIG. 3, this compound spectrum matrix L is commonly used in the estimation of the compound weight vector wt regardless of the measurement time.

The compound-weight time-series data calculator 42 sets the time variable t to the first measurement time point t1 within the specified time range for the processing (Step S4). Then, the calculator reads, from the mass spectrum data storage section 41, the mass spectrum data at the measurement time point t from among the data specified as the process target, and creates a measured vector wt (Step S5). Based on the measured vector Mt obtained in this manner and the compound spectrum matrix L mentioned earlier, the calculator estimates the compound weight vector wt by the previously described method (Step S6). The obtained compound weight vector wt is temporarily stored.

Subsequently, whether or not the measurement time point t is located at the last measurement time point t2 within the time range for the processing is determined (Step S7). If the current measurement time point t has not reached t2 yet, the measurement time interval $\Delta t$ is added to the current measurement time point t, and the obtained value is set as the new measurement time point t (Step S8). Then, the operation returns to Step S5. By the repetition of Steps S5 through S8, a compound weight vector wt is obtained at each of the measurement time points separated from each other by the measurement time interval $\Delta t$ within the time range of t1-t2, as shown in FIG. 3. After the current measurement time point t has reached t2, the determination result in Step S7 becomes "Yes". The compound-weight time-series graph creator 43 creates a compound-weight time-series matrix by arranging the compound weight vectors in a time-series order. Furthermore, it creates a compound-weight time-series graph for a specified target compound by extracting the values of the weight corresponding to the target compound and creating a graph showing those values (Step S9).

Thus, a compound-weight time-series graph showing a temporal change in weight is obtained for each of the target compounds specified by the user.

As noted earlier, a compound-weight time-series graph corresponding to one compound reflects the concentration of the compound in a similar manner to the XIC. Therefore, the shape of a peak originating from the compound on the compound-weight time-series graph becomes similar to that of a peak originating from the same compound on the XIC. Accordingly, the peak detector 44 detects a peak on the compound-weight time-series graph for each target compound. Conventionally known algorithms can be similarly used for the peak detection. When a peak has been detected, the peak detector 44 calculates the area value of the peak. The quantitative calculator 45 derives a quantitative value (concentration or content value) from the calculated peak area value by referring to the calibration curve corresponding to the same target compound stored in the compound-weight time-series calibration curve storage section 47. If no significant peak has been detected on the compound-weight time-series graph, it is possible to conclude that the compound is not contained in the sample.

If there are a plurality of specified target compounds, the same processing can be performed for each target compound using the corresponding compound-weight time-series graph. The obtained quantitative determination results are presented on the display unit 6. It is preferable to display the compound-weight time-series graphs used for the quantitative calculation along with those results on the screen of the display unit 6.

It should be noted that the compound-weight time-series calibration curve storage section 47 holds experimentally determined calibration curves beforehand, each of which corresponds to one compound and shows the relationship between the peak area value on the compound-weight time-series graph and the quantitative value.

In the previous description, the L2 norm is used as the regularizer in the estimation of the compound weight vector wt. The L1 norm can also be used as the regularizer.

In general, using the L1 norm as the regularizer produces a higher noise-removing effect and yields a higher SN ratio than using the L2 norm when the separation performance in the chromatograph is high and there is no overlapping of the compounds, i.e. when the peak originating from the target compound is an isolated peak. On the other hand, when there are a plurality of compounds overlapping each other, and particularly, when there is the overlapping of a compound in a comparatively large quantity and a compound in an extremely small quantity, using the L1 norm as the regularizer may cause the weight of the extremely low peak to be absorbed into the high-intensity peak, and the weight of the extremely low peak may be converged on zero and undetectable. By comparison, using the L2 norm as the regularizer can resolve the overlapping peaks and make the extremely low peak observable, although the SN ratio of each peak cannot be very high.

Therefore, when the state of overlapping of the compounds can be estimated to a certain degree of correctness from the kinds of compounds contained in the sample or other related information, it is possible to select either the L1 norm or the L2 norm as the regularizer depending on the estimated result. However, in many cases, or for general purposes, it is difficult to previously and correctly estimate the state of overlapping of the compounds. Accordingly, it is preferable to introduce the elastic net so as to use the L1 norm and the L2 norm in a switchable manner or simultaneously use both the L1 norm and the L2 norm. As described in Non-Patent Literature 1 or other documents, in the elastic net, the degrees of contribution of the L1 norm and the L2 norm are adjusted according to the value of the parameter α (0≤α≤1). Specifically, α=0 means the use of the L2 norm, and α=1 means the use of the L1 norm. Within the range of 0<α<1, using a value of α closer to zero makes the regularizing condition closer to the L2 norm. Accordingly, a more robust peak can be obtained by giving an appropriate value to the parameter α according to the state of the compounds contained in the sample or other factors.

It is naturally possible to allow users to manually set this parameter α. However, it is practically difficult or cumbersome to appropriately set the parameter α. Accordingly, for example, it is preferable to automatically determine the state of overlapping of the compounds from a peak detected on an obtained XIC and set an appropriate value of α based on the determination result before the previously described processing is performed.

Figure 4A:
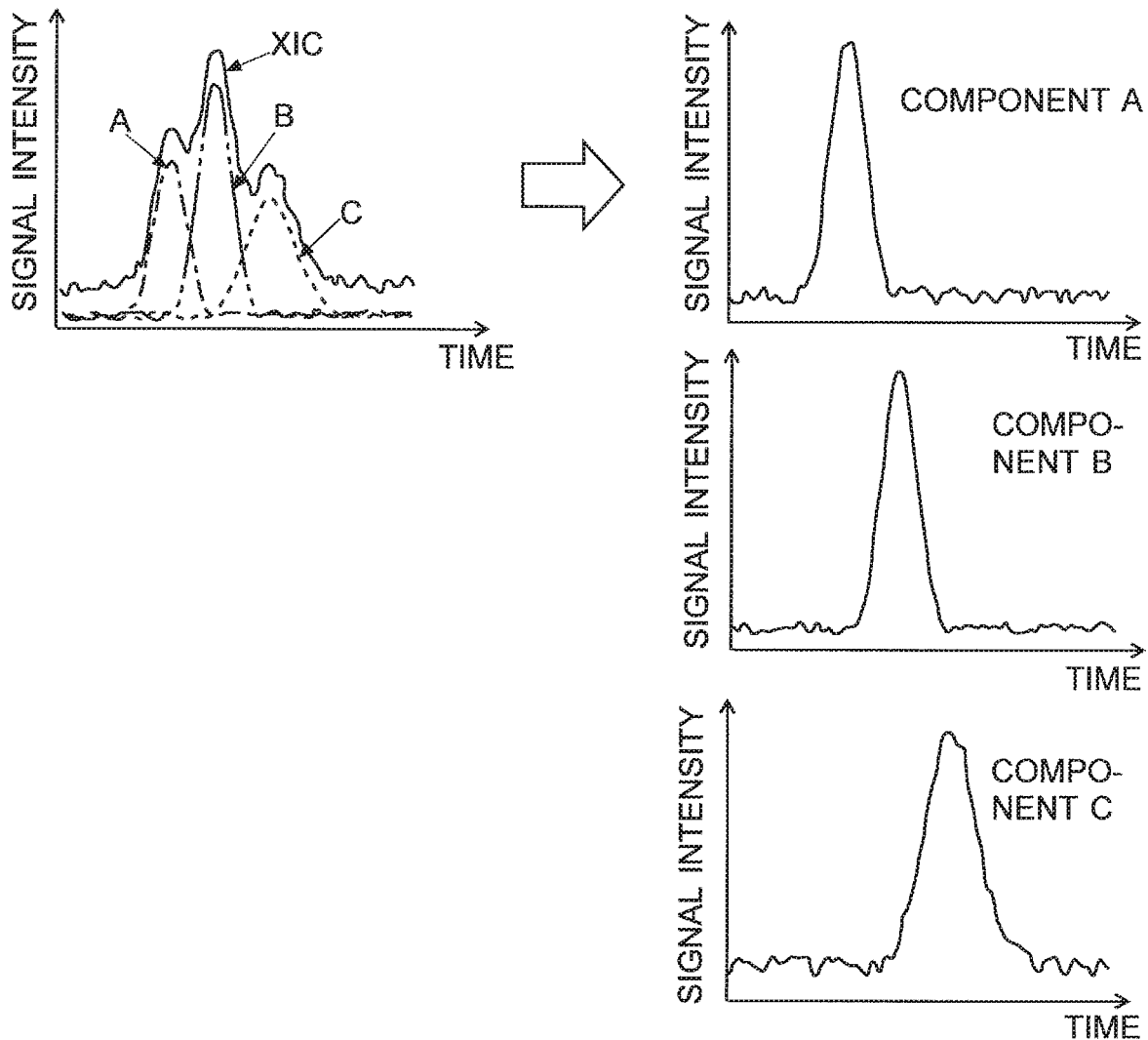
FIGS. 4A and 4B are examples of the compound-weight time-series graphs obtained in the case where a regularized minimum norm estimation using the elastic net is performed.
Figure 4B:
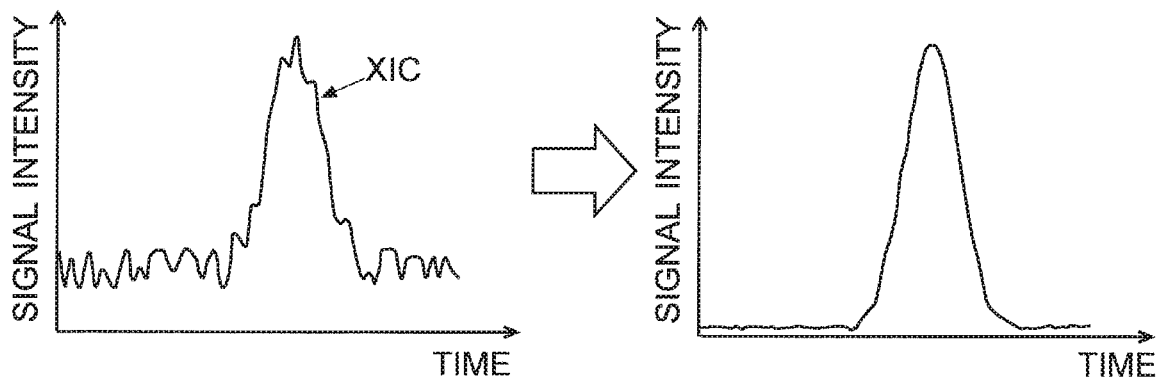

FIGS. 4A and 4B show examples of the compound-weight time-series graphs obtained in the case where a regularized minimum norm estimation using the elastic net is performed. The left graph in FIG. 4A is an example with three compounds A, B and C overlapping each other on the XIC. Even if it is impossible to completely resolve overlapping peaks on an XIC, it is comparatively easy to detect the fact that there is an overlapping of peaks. In the present example, it is most likely that there are three or more low peaks within the time range from the beginning point to the ending point of the large peak. Accordingly, a value close to zero should be given to the parameter α. As a result, for example, as shown on the right part of FIG. 4A, three compound-weight time-series graphs are obtained on which the peaks that respectively correspond to the three compounds A, B and C are observed.

FIG. 4B shows an example in which there is no overlapping of the compounds on the XIC, although there is a considerable amount of noise. The small peaks originating from the noise and superposed on the large peak can be removed, for example, by smoothing or similar processing. Therefore, in the present case, it is possible to determine that the peak is likely to have originated from a single compound. Accordingly, a value close to one should be given to the parameter α. As a result, for example, as shown on the right part of FIG. 4B, a compound-weight time-series graph can be obtained on which a high-SN-ratio peak from which the noise has been satisfactorily removed is observed.

The previous embodiment is concerned with the case of applying the present invention to data obtained with an LC-MS. The present invention can also be applied to data obtained with a GC-MS.

The previous embodiment is a mere example of the present invention. It is evident that any change, addition or modification appropriately made to the embodiment within the spirit of the present invention will fall within the scope of claims of the present application.

REFERENCE SIGNS LIST

1 . . . Liquid Chromatograph (LC) Unit
2 . . . Mass Spectrometer (MS) Unit
3 . . . Analogue-to-Digital Converter (ADC)
4 . . . Data Processing Unit
41 . . . Mass Spectrum Data Storage Section
42 . . . Time-Series Data Calculator
43 . . . Time-Series Graph Creator
44 . . . Peak Detector
45 . . . Quantitative Calculator
46 . . . Standard Mass Spectrum Library
47 . . . Time-Series Calibration Curve Storage Section
5 . . . Input Unit
6 . . . Display Unit

The invention claimed is:

1. A chromatograph mass spectrometric data processing method for determining a presence or absence of a target compound in a sample or determining a quantity of the target compound in the sample by processing mass spectrum data repeatedly acquired with a passage of time by chromatograph mass spectrometry, comprising:
  a) a compound weight vector calculation step including: performing a maximum likelihood estimation for each of the repeatedly acquired mass spectrum data respectively acquired at measurement time points within a predetermined time range to determine a compound weight vector wt at each measurement time point, the predetermined time range including at least a retention time of the target compound, where the maximum likelihood estimation includes: determining, in a form of a linear regression model, a relationship of a measured vector Mt, the compound weight vector wt, and a compound spectrum matrix L, where the measured vector Mt is based on mass spectrum data acquired at a measurement time point t, has a dimension number equal to a number of mass-to-charge-ratio points and includes signal intensity values as elements, the compound weight vector wt has a dimension number equal to a number of target compounds at the measurement time point t and includes weights of the respective target compounds as elements, and the compound spectrum matrix L is based on standard mass spectra of the target compounds from a database, has a row dimension number equal to the number of mass-to-charge-ratio points and a column dimension number equal to the number of target compounds, and includes signal intensity values as elements; and estimating the compound weight vector wt by a minimum norm estimation in which a regularizer is introduced, based on the measured vector Mt and the compound spectrum matrix L; and
  b) a peak detection step including: creating a graph in which the weights of the target compound are arranged in a time-series order to show a temporal change in weight, based on a plurality of the compound weight vectors wt acquired for a predetermined time range in the compound weight vector calculation step, and detecting a peak corresponding to the target compound in the graph, and
  c) a determination step including: determining the presence or absence of the target compound in the sample or determining the quantity of the target compound in the sample by performing a qualitative determination or quantitative determination for the target compound using the peak detected in the peak detection step.

2. The chromatograph mass spectrometric data processing method according to claim 1, wherein the regularizer is an L1 norm.

3. The chromatograph mass spectrometric data processing method according to claim 1, wherein the regularizer is an L2 norm.

4. The chromatograph mass spectrometric data processing method according to claim 1, wherein one of an L1 norm and an L2 norm is switched to be the regularizer based on a manual operation by a user or an automatic determination process, or both the L1 norm and the L2 norm are simultaneously used as the regularizer.

5. The chromatograph mass spectrometric data processing method according to claim 4, wherein an elastic net is introduced to use the one of the L1 norm and the L2 norm based on the manual operation by the user or the automatic determination process or to simultaneously use both the L1 norm and the L2 norm.

6. A chromatograph mass spectrometric data processing device for determining a presence or absence of a target compound in a sample or determining a quantity of the target compound in the sample by processing mass spectrum data repeatedly acquired with a passage of time by chromatograph mass spectrometry, comprising:
   a) a compound weight vector calculator for performing a maximum likelihood estimation for each of the repeatedly acquired mass spectrum data respectively acquired at measurement time points within a predetermined time range to determine a compound weight vector wt at each measurement time point, the predetermined time range including at least a retention time of the target compound, where the maximum likelihood estimation includes: determining, in a form of a linear regression model, a relationship of a measured vector Mt, the compound weight vector wt, and a compound spectrum matrix L, where the measured vector Mt is based on mass spectrum data acquired at a measurement time point t, has a dimension number equal to a number of mass-to-charge-ratio points and includes signal intensity values as elements, the compound weight vector wt has a dimension number equal to a number of target compounds at the measurement time point t and includes weights of the respective target compounds as elements, and the compound spectrum matrix L is based on standard mass spectra of the target compounds from a database, has a row dimension number equal to the number of mass-to-charge-ratio points and a column dimension number equal to the number of target compounds, and includes signal intensity values as elements; and estimating the compound weight vector wt by a minimum norm estimation in which a regularizer is introduced, based on the measured vector Mt and the compound spectrum matrix L;
   b) a peak detector for creating a graph in which the weights of a target compound are arranged in a time-series order to show a temporal change in weight, based on a plurality of the compound weight vectors wt acquired for a predetermined time range by the compound weight vector calculator, and detecting a peak corresponding to the target compound in the graph; and
   c) a processor for determining the presence or absence of the target compound in the sample or to determining the quantity of the target compound in the sample by performing a qualitative determination for the target compound based on a peak detection result by the peak detector or a quantitative determination for the target compound based on an area or height of the peak detected by the peak detector.

7. The chromatograph mass spectrometric data processing device according to claim 6, wherein the regularizer is an L1 norm.

8. The chromatograph mass spectrometric data processing device according to claim 6, wherein the regularizer is an L2 norm.

9. The chromatograph mass spectrometric data processing device according to claim 6, wherein one of an L1 norm and an L2 norm is switched to be the regularizer based on a manual operation by a user or an automatic determination processing, or both the L1 norm and the L2 norm are simultaneously used as the regularizer.

10. The chromatograph mass spectrometric data processing device according to claim 9, wherein an elastic net is introduced to use the one of the L1 norm and the L2 norm based on the manual operation by the user or the automatic determination process or to simultaneously use both the L1 norm and the L2 norm.

* * * * *